United States Patent
Yamazaki et al.

(10) Patent No.: US 6,198,377 B1
(45) Date of Patent: *Mar. 6, 2001

(54) PLASTIC THERMISTOR AND THERMOSENSITIVE DEVICE COMPRISING THE SAME

(75) Inventors: Tadataka Yamazaki, Katano; Masahiko Ito, Kashihara; Kazuyuki Kohara, Souraku-gun, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/765,961

(22) PCT Filed: Jul. 13, 1995

(86) PCT No.: PCT/JP95/01398

§ 371 Date: Jan. 2, 1997

§ 102(e) Date: Jan. 2, 1997

(87) PCT Pub. No.: WO96/02923

PCT Pub. Date: Feb. 1, 1996

(30) Foreign Application Priority Data

Jul. 13, 1994 (JP) .................................................. 6-161225
Oct. 21, 1994 (JP) .................................................. 6-255915
May 18, 1995 (JP) .................................................. 7-119685
May 18, 1995 (JP) .................................................. 7-119687

(51) Int. Cl.$^7$ ...................................................... H01C 3/04
(52) U.S. Cl. ................................................ 338/25; 338/26
(58) Field of Search ............................ 338/22 R, 225 D, 338/25, 26; 252/519.53, 519.34

(56) References Cited

U.S. PATENT DOCUMENTS

| 2,687,395 | * | 8/1954 | Marks ............................ 252/519.34 |
| 2,863,035 | * | 12/1958 | Vinson et al. ........................ 338/26 |
| 3,441,893 | * | 4/1969 | Gordon ................................. 338/26 |

(List continued on next page.)

FOREIGN PATENT DOCUMENTS 6-151111   5/1994   (JP) .

OTHER PUBLICATIONS

*Patent Abstracts of Japan;* vol. 008, No. 062 (C–215), Mar. 23, 1984 & JP 58 215449 A (Daicel KK), Dec. 14, 1983. *abstract*.

(List continued on next page.)

* cited by examiner

*Primary Examiner*—Karl D. Easthom
(74) *Attorney, Agent, or Firm*—Wenderoth, Lind & Ponack L.L.P.

(57) ABSTRACT

A plastic thermistor comprising a polyamide composition which comprises 100 wt. parts of a polyamide and 5.3 to 30 wt. parts of zinc iodide, or a polyamide composition which comprises a polyamide, an iodine-containing compound, and a metal oxide such as zinc oxide.

Ion carrier properties of a metal iodide greatly increases temperature dependence of impedance, and the metal oxide such as zinc iodide functions as a receptor for iodide ions and prevents the formation of a metal iodide on the surfaces of metal electrodes. Furthermore, a linked cycle can be established that zinc oxide forms zinc iodide and then formed zinc iodide functions to increase the stability of half-wave current passage. Accordingly, the thermal stability of the plastic thermistor is improved for a long time, and the heat resistance stability of temperature sensors or thermosensitive heaters comprising the plastic thermistor is improved greatly.

30 Claims, 2 Drawing Sheets

Relationship between amount of zinc iodide and heat resistance of electrical and mechanical properties

U.S. PATENT DOCUMENTS

| | | | | |
|---|---|---|---|---|
| 3,551,356 | * | 12/1970 | Bowman | 252/519.53 |
| 3,760,319 | * | 9/1973 | Kawazoe | 338/26 |
| 3,925,261 | * | 12/1975 | Lauterbach-Dammler | 252/519.53 |
| 3,936,396 | * | 2/1976 | Masuyama et al. | 252/518 |
| 4,200,701 | * | 4/1980 | Wetton et al. | 252/519.34 |
| 4,426,546 | * | 1/1984 | Hotta et al. | 136/256 |
| 4,466,911 | * | 8/1984 | House | 252/519.34 |
| 5,313,185 | * | 5/1994 | DeChurch | 338/22 R |

OTHER PUBLICATIONS

*Patent Abstracts of Japan;* vol. 095, No. 002, Mar. 31, 1995 & JP 06 323923 A (Matsushita Electric Ind Co Ltd), Nov. 25, 1994, *abstract*.

*Patent Abstracts of Japan;* vol. 095, No. 009, Oct. 31, 1995 & JP 07 142210 A (Matsushita Electric Ind Co Ltd), Jun. 2, 1995, *abstract*.

*Patent Abstracts of Japan;* vol. 095, No. 002, Mar. 31, 1995 & JP 06 323926 A (Matsushita Electric Ind Co Ltd), Nov. 25, 1994, *abstract*.

Relationship between amount of zinc iodide and heat resistance of electrical and mechanical properties

PLASTIC THERMISTOR AND THERMOSENSITIVE DEVICE COMPRISING THE SAME

BACKGROUND OF THE INVENTION

1. Field of the Invention

The present invention relates to a plastic thermistor and a thermosensitive device comprising the same. In particular, the present invention relates a plastic thermistor which is used in flexible temperature sensors or thermosensitive heaters such as electric heaters and the like, and a thermosensitive device comprising the plastic thermistor.

2. Prior Art

In general, a plastic thermistor is provided between a pair of electrodes, and used as a flexible linear temperature sensor or thermosensitive heater.

Conventional plastic thermistors comprise a composition containing polyamide such as Nylon 12 or modified Nylon 11 which is disclosed in JP-A-55-100693 (trade name: RILSAN N NYLON available from ATO-CHIMIE). The plastic thermistors function as temperature sensors by utilizing temperature change of their electrostatic capacity, resistance or impedance.

JP-B-60-48081 discloses a polyamide composition containing a phosphite ester as an improver for heat deterioration, and JP-A-64-30203 discloses an ionically conductive thermosensitive composition containing a copper inactivation agent and a phenolic antioxidant.

However, it is difficult to use Nylon 12 practically, since it has low moisture absorbability, but its thermosensing characteristics vary widely depending on the humidity when it is used as the temperature sensor.

The modified polyamide which is disclosed in JP-A-55-100693 has poor heat stability, and low temperature sensing properties since it has less temperature dependence of impedance.

It is proposed to compound a polycondensate of a phenol compound with an aldehyde for the improvement of moisture resistance and thermosensitivity, as disclosed in JP-B-3-50401. Furthermore, JP-A-58-215449 proposes a polyamide composition comprising 0.02 to 5 wt. % of zinc iodide for increasing the temperature dependence of impedance. However, the former composition has low temperature dependence of impedance, while the latter composition has improved temperature dependence of the initial impedance but it still has insufficient heat stability of an impedance-temperature curve like the former composition.

SUMMARY OF THE INVENTION

An object of the present invention is to provide a plastic thermistor which has large temperature dependence of impedance and good heat stability for a long time.

According to the first aspect, the present invention provides a plastic thermistor comprising a polyamide composition which comprises 100 wt. parts of a polyamide and 5.3 to 30 wt. parts of zinc iodide.

According to the second aspect, the present invention provides a plastic thermistor comprising a polyamide composition which comprises a polyamide, at least one additive selected from the group consisting of iodine and iodine-containing compounds, and a metal oxide, preferably zinc oxide.

In a preferred embodiment, the polyamide composition of the present invention further comprises at least one compound selected from the group consisting of naphthylamine and hindered phenols, a phosphite ester or a metal inactivation agent.

DETAILED DESCRIPTION OF THE INVENTION

Figure 1:
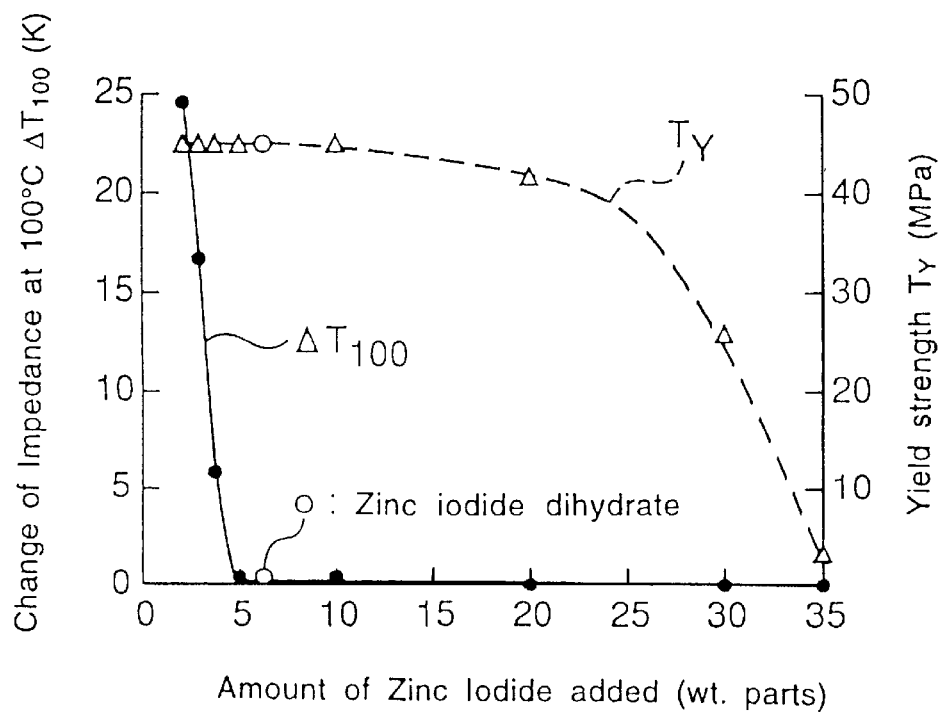
FIG. 1 is a graph showing a relationship between the amount of zinc iodide and heat resistance of the electrical and mechanical properties in Example 1 according to the present invention.

In general, the plastic thermistor is provided between a pair of winding wire electrodes of copper or copper alloys, and used as the flexible linear temperature sensor or thermosensitive heater. The heat resistance stability of the temperature sensor or thermosensitive heater depends on the stability of the plastic thermistor itself and also on surface conditions of the winding wire electrodes.

The polyamide used in the present invention can be, for example, at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

When the first polyamide composition according to the present invention is used, the ion carrier properties of zinc iodide contained in the plastic thermistor can greatly increase the temperature dependence of impedance, and the formation of a zinc complex with the amide groups of the polymer improves the stability of electric current passage and also the thermal stability of the composition.

The present invention compounds zinc iodide in an amount of between 5.3 and 30 wt. parts per 100 wt. parts of the polyamide. When zinc iodide is compounded in this amount range, a sufficient amount of iodine atoms is supplied, and therefore the relationship between the impedance and temperature is stabilized at a high temperature around 100° C. and the high temperature durability is improved for a long time.

When the second polyamide composition according to the present invention which comprises iodine or an iodine-containing compound such as zinc iodide, and a metal oxide such as zinc oxide is used, the ion carrier properties of the metal iodide compound contained in the plastic thermistor can greatly increase the temperature dependence of impedance.

Furthermore, when an iodine-containing organic compound is used, the iodine atoms liberated from the iodine-containing organic compound react with the metal oxide such as zinc metal and zinc iodide is formed. Formed zinc iodide increases the temperature dependence of impedance and also forms a zinc complex with the amide groups of the polymer, so that the stability of electric current passage and also the thermal stability of the composition are improved.

The iodine atoms liberated from the iodine-containing compound are localized around the amide groups when the composition is used at a high temperature for a long time, while they react as iodide ions with the metal electrodes and form the metal iodide which is electrically insulating and deteriorates the stability of impedance between the electrodes. For example, when copper electrodes are used, copper iodide forms and therefore the stability of impedance over time between electrodes may not be maintained.

When the metal oxide such as zinc oxide is used in combination with iodine or the iodine-containing compound, the metal oxide functions as a receptor for the iodide ions and prevents the formation of metal iodide on the surfaces of the metal electrodes. Furthermore, a linked cycle may be established that zinc oxide forms zinc iodide and then formed zinc iodide functions to increase the stability of passage of the half-wave current. Accordingly, the thermal stability of the plastic thermistor is improved for a long time, and the heat resistance stability of the temperature sensors or thermosensitive heaters comprising the plastic thermistor is improved greatly.

In addition, the antioxidative properties of the hindered phenols or naphthylamine further improve the thermal stability of the polyamide composition.

The properties of zinc iodide and zinc oxide and those of the hindered phenols or naphthylamine do not interfere each other while those properties overlap, when they are used in combination according to the present invention. Rather, their combination achieves synergistic effects. Therefore, the above combination of the materials can improve the thermal stability of the plastic thermistor and greatly increase the heat resistance stability of the temperature sensors or thermosensitive heaters comprising the plastic thermistor.

The compounding of the phosphite ester in the composition improves the heat resistance stability, and reduction rust-preventing properties. For example, phosphite esters having a large molecular weight and a high phosphorus content (e.g. tetraphenyl dipropylene glycol diphosphite, tetraphenyl tetra(tridecyl)pentaerythritol tetraphosphite and hydrogenated phenol A pentaerythritol phosphite polymer) can greatly suppress the thermal deterioration by the synergistic effect of the heat stability and reduction rust-preventing properties of such phosphite ester. This effect is poor when the phosphorus content is low. However, a too high phosphorus content may be unpractical. The phosphorus content is between 3 and 20 wt. % based on the weight of the polyamide. The best effect can be obtained in the range between 5 and 15 wt. %. The phosphite esters easily vaporize at high temperatures and their effects do not last a long time, when their molecular weights are low. The phosphite esters are hardly dispersed in the polymer composition when their molecular weight exceeds 5000. The desirable molecular weight is in the range between 300 and 3500.

The electrical resistance at an interface between the copper electrode and the polyamide composition is stabilized and also the thermal deterioration of the polyamide composition due to ill effects of copper can be prevented by the addition of a metal inactivation agent such as decamethylenedicarboyxlic acid disalicyloylhydrazide, N,N'-bis[3-(3,5-tert.-butyl-4-hydroxyphenyl)propionyl]hydrazine, 1,2,3-benzotriazole and its derivatives (e.g. 1-hydroxymethylbenzotriazole and 1,2-dicarboxyethylbenzotriazole), and the like.

Furthermore, strong resistance to moisture absorption can be imparted to the polyamide composition by the compounding of the polycondensate of the phenol compound with the aldehyde. For example, the phenol base compounds such as hydroxybenzoate-formaldehyde polycondensates have good compatibility with the polyamide, and are coordinated with hydrogen-bonding sites in place of water molecules in the polyamide. Therefore, the moisture absorption is decreased and the fluctuation of the thermosensing properties due to moisture is suppressed. Furthermore, the reaction of the polycondensate with the amide groups increases the temperature sensing properties.

The properties of zinc iodide and zinc oxide and those of the hindered phenols or naphthylamine, phosphite ester and metal inactivation agent do not interfere with each other while those properties overlap, when they are used in combination according to the present invention. Rather, their combination achieves the synergistic effects. Therefore, the above combination of the materials can improve the thermal stability of the plastic thermistor to be used together with the copper electrodes and greatly increase the heat resistance stability of the temperature sensors or thermosensitive heaters comprising the plastic thermistor.

When the electrode material is a noble metal such as gold, platinum or palladium, or when it is plated, the metal iodide hardly forms. When the electrode material is silver, tin, a solder, stainless steel, titanium or indium, the composition of the present invention can improve the stability of impedance over time between the electrodes since the electrical conductivity of the iodide of such metal is comparatively high. When the electrode forms the iodide in its surface layer, the inside layer of the electrode can be made of a cheap metal having good electrical conductivity, and the stability of electric current passage and cost reduction are both achieved.

EXAMPLES

Examples of the present invention will be illustrated.

Example 1

Nylon 12 having low moisture absorption was used as a polyamide in Example 1.

Zinc iodide in a varying amount from 2 to 25 wt. parts was compounded into 100 wt. parts of Nylon 12, and kneaded in an extruder. Then, the compound was heat pressed, and a sheet having sizes of about 70×70 mm and a thickness of 1 mm was obtained.

A dumbbell shaped sample was prepared from the obtained sheet, and its yield strength was measured. The strength severely decreased when the amount of zinc iodide exceeded 30 wt. parts.

Silver electrodes were formed on both surfaces of the sheet, and the change of impedance was measured between the initial impedance at 100° C. and the impedance after applying the half-wave rectified voltage of 100 V for 1000 hours at 100° C. The results are plotted in FIG. 1. The results show that the impedance was very much stabilized when the added amount of zinc iodide was 3.5 wt. parts or higher.

It is understood from the above results that the addition of 5.3 to 30 wt. parts of zinc iodide to 100 wt. parts of the polyamide contributes to the stabilization of the heat resistant electrical and mechanical properties.

Example 2

In Example 2, Nylon 12, Nylon 12-Nylon 40 copolymer, N-alkyl-substituted polyamide 11, polyether amide and dimer acid-containing amide, which have low moisture absorption, were selected as polyamides.

Iodide compounds having high heat stability were used as current stabilizers for imparting electrical conductivity which increase the temperature dependence of impedance of the polymers. Furthermore, powdery zinc oxide, magnesium oxide and lead oxide having particle sizes between 0.1 and 0.5 μm were used as iodine receptors. Poly[(2-oxo-1-pyrrolidinyl)ethylene] iodide was used as an iodine donor. When a polycondensate of a phenol compound with an aldehyde was added, 15 wt. parts of octyl hydroxybenzoate-formamide polycondensate having good compatibility with the polyamide was used per 100 wt. parts of the polyamide.

The above components were compounded and kneaded with an extruder. Then, the compound was heat pressed, and a sheet having a size of about 70×70 mm and a thickness of 1 mm is obtained.

A sample was produced by forming copper electrodes on both surfaces of the sheet.

The dependence of the properties on the electrode materials was studied using the electrode materials listed in Table 2.

The temperature dependence of impedance was expressed by a thermistor B constant between 40° C. and 80° C.

The heat resistance stability was expressed by the temperature difference ($\Delta T_z$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Tables 1 and 2.

TABLE 2

Composition of plastic thermistor, electrode materials and properties

| | Composition (wt. parts) | | Electrode material | Thermistor B constant (K) | $\Delta T_z$ (K) |
|---|---|---|---|---|---|
| | Polyamide | Additive | | | |
| Com. Ex. 1 | Nylon 12 (100) | Cobalt iodide (6.0) Zinc oxide (5.0) | Copper sheet | 13,400 | 11 |
| Ex. 1 | N-alkyl substituted nylon 11 (100) | Cobalt iodide (5.0) Zinc oxide (5.0) | Silver sheet | 13,800 | 3 |
| Ex. 2 | Nylon 12-nylon 40 copolymer (100) | Nickel iodide (5.0) Zinc oxide (5.0) | Silver-plated copper sheet | 13,900 | 3 |
| Ex. 3 | Nylon 12 (100) | Manganese iodide (6.0) Zinc oxide (5.0) | Tin-plated copper sheet | 11,600 | 4 |
| Ex. 4 | Nylon 12 (100) | Lead iodide (6.0) Zinc oxide (5.0) | Solder-plated copper sheet | 11,500 | 4.5 |
| Ex. 5 | Nylon 12 (100) | Cobalt iodide (6.0) Zinc oxide (5.0) | Stainless steel sheet | 13,400 | 4 |
| Ex. 6 | Nylon 12 (100) | Pottasium iodide (1.0) Copper iodide (1.0) Zinc oxide (5.0) | Palladium/gold-plated copper sheet | 13,500 | 3 |

TABLE 1

Composition and properties of plastic thermistor (copper electrodes)

| | Composition (wt. parts) | | | | Thermistor | |
|---|---|---|---|---|---|---|
| | Polyamide | Iodine-containing compound | Metal oxide | Others | B constant (K) | $\Delta T_z$ (K) |
| Com. Ex. 1 | Nylon 12 (100) | | | | 3,500 | 18 |
| Com. Ex. 2 | N-alkyl substituted nylon 11 (100) | | | | 3,000 | 19.5 |
| Com. Ex. 3 | Nylon 12 (100) | Nickel iodide (5.0) | | | 13,500 | ≧25 |
| Com. Ex. 4 | Nylon 12 (100) | Cobalt iodide (5.0) | | | 13,800 | ≧25 |
| Ex. 1 | Nylon 12 (100) | Nickel iodide hexahydrate (6.0) | Zinc oxide (5.0) | | 13,500 | 12 |
| Ex. 2 | Nylon 12 (100) | Cobalt iodide (5.0) | Magnesium oxide (5.0) | | 13,800 | 11 |
| Ex. 3 | Nylon 12-nylon 40 copolymer (60) Nylon 12 (40) | Manganese iodide (5.0) | Lead oxide (5.0) | | 11,500 | 11 |
| Ex. 4 | Nylon 12 (70) N-alkyl substituted nylon (30) | Iron iodide (0.5) Titanium iodide (4.5) | Zinc oxide (3.0) Magnesium oxide (2.0) | | 12,000 | 12 |
| Ex. 5 | Nylon 12 (50) Polyetheramide (50) | Lead iodide (4.0) Sodium iodide (0.5) | Lead oxide (5.0) | Octyl oxybenzoate ester-formaldehyde polycondensate (15) | 12,600 | 13 |
| Ex. 6 | Nylon 11 (65) N-alkyl substituted nylon (20) Dimer acid-containing amide (15) | Potassium iodide (1.0) Copper iodide (1.0) | Zinc oxide (3.5) Magnesium oxide (1.5) | | 13,500 | 13 |
| Ex. 7 | Nylon 12 (100) | Antimony iodide (4.0) | Zinc oxide (5.0) | | 12,000 | 12 |
| Ex. 8 | Nylon 12 (100) | Tin iodide (1.5) | Zinc oxide (5.0) | | 13,000 | 12 |
| Ex. 9 | Nylon 12 (100) | Cadmium iodide (2.0) | Zinc oxide (5.0) | | 12,000 | 11 |
| Ex. 10 | Nylon 12 (100) | Iodine (3.0) Poly[(2-oxo-1-pyrrolidinyl)ethylene]iodide (5.0) | Zinc oxide (5.0) | | 13,000 | 15 |

Example 3

In Example 3, metal iodides which are iodine-containing compounds with high heat stability were used as current stabilizers for imparting electrical conductivity which increase the temperature dependence of impedance of the polymer. Furthermore, zinc oxide powder having particle sizes between 0.1 and 0.5 μm was used as an iodine receptor. When a polycondensate of a phenol compound with an aldehyde was added, 15 wt. parts of octyl hydroxybenzoate-formamide polycondensate having good compatibility with the polyamide was used per 100 wt. parts of the polyamide.

Then, a sample was produced by forming a sheet having the same sizes as in Example 1, and forming copper electrodes on the both surfaces of the sheet.

The dependence of the properties on the electrode materials was studied using the electrode materials listed in Table 4.

The temperature dependence of impedance was expressed by a thermistor B constant between 40° C. and 80° C.

The heat resistance stability was evaluated in terms of a time in which the yield strength decreased to half of the initial value, when a heat aging test in an air at 120° C. was performed with a dumbbell shaped sample. Also, the heat resistance stability was expressed by the temperature difference ($\Delta T_2$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Tables 3 and 4.

As seen from Examples 2 and 3, the iodine-containing compounds such as tin iodide, antimony iodide, copper iodide, nickel iodide, manganese iodide, cobalt iodide, iron iodide, lead iodide, cadmium iodide, titanium iodide, sodium iodide, potassium iodide and poly[(2-oxo-1-

TABLE 4

Composition of plastic thermistor, electrode materials and properties

| | Composition (wt. parts) | | Electrode material | Thermistor B constant (K) | $\Delta T_z$ (K) |
|---|---|---|---|---|---|
| | Polyamide | Additive | | | |
| Com. Ex. 1 | Nylon 12 (100) | Cobalt iodide (6.0) Zinc oxide (5.0) | Copper sheet | 13,400 | 11 |
| Ex. 1 | N-alkyl substituted nylon 11 (100) | Cobalt iodide (5.0) Zinc oxide (5.0) | Silver sheet | 13,800 | 3 |
| Ex. 2 | Nylon 12-nylon 40 copolymer (100) | Nickel iodide (5.0) Zinc oxide (5.0) | Silver-plated copper sheet | 13,900 | 3 |
| Ex. 3 | Nylon 12 (100) | Manganese iodide (6.0) Zinc oxide (5.0) | Tin-plated copper sheet | 11,600 | 4 |
| Ex. 4 | Nylon 12 (100) | Lead iodide (6.0) Zinc oxide (5.0) | Solder-plated copper sheet | 11,500 | 4.5 |
| Ex. 5 | Nylon 12 (100) | Cobalt iodide (6.0) Zinc oxide (5.0) | Stainless steel sheet | 13,800 | 4 |
| Ex. 6 | Nylon 12 (100) | Pottasium iodide (1.0) Copper iodide (1.0) Zinc oxide (5.0) | Palladium/gold-plated copper sheet | 13,500 | 3 |

TABLE 3

Composition and properties of plastic thermistor (copper electrodes)

| | Composition (wt. parts) | | | | Thermistor | |
|---|---|---|---|---|---|---|
| | Polyamide | Iodine-containing compound | Zinc oxide | Others | B constant (K) | $\Delta T_z$ (K) |
| Com. Ex. 1 | Nylon 12 (100) | | | | 3,500 | 18 |
| Com. Ex. 2 | N-alkyl substituted nylon 11 (100) | | | | 3,000 | 19.5 |
| Com. Ex. 3 | Nylon 12 (100) | Nickel iodide (5.0) | | | 13,500 | ≧25 |
| Com. Ex. 4 | Nylon 12 (100) | Cobalt iodide (5.0) | | | 13,800 | ≧25 |
| Ex. 1 | Nylon 12 (100) | Nickel iodide hexahydrate (6.0) | (5.0) | | 13,500 | 12 |
| Ex. 2 | Nylon 12 (100) | Cobalt iodide (5.0) | (5.0) | | 13,800 | 11 |
| Ex. 3 | Nylon 12-nylon 40 copolymer (60) Nylon 12 (40) | Manganese iodide (5.0) | (5.0) | | 11,500 | 11 |
| Ex. 4 | Nylon 12 (70) N-alkyl substituted nylon (30) | Iron iodide (0.5) Titanium iodide (4.5) | (5.0) | | 12,000 | 12 |
| Ex. 5 | Nylon 12 (50) Polyetheramide (50) | Lead iodide (4.0) Sodium iodide (0.5) | (5.0) | Octyl oxybenzoate ester-formaldehyde polycondensate (15) | 12,600 | 13 |
| Ex. 6 | Nylon 11 (65) N-alkyl substituted nylon (20) Dimer acid-containing amide (15) | Potassium iodide (1.0) Copper iodide (1.0) | (5.0) | | 13,500 | 13 |
| Ex. 7 | Nylon 12 (100) | Antimony iodide (4.0) | (5.0) | | 12,000 | 12 |
| Ex. 8 | Nylon 12 (100) | Tin iodide (1.5) | (5.0) | | 13,000 | 12 |
| Ex. 9 | Nylon 12 (100) | Cadmium iodide (2.0) | (5.0) | | 12,000 | 11 |
| Ex. 10 | Nylon 12 (100) | Iodine (3.0) Poly[(2-oxo-1-pyrrolidinyl)ethylene] iodide (5.0) | (5.0) | | 13,000 | 15 | pyrrolidinyl)ethylene] iodide and their hydrates can be used as the current stabilizers according to the present invention, and contribute to the increase of the thermistor B constants.

In addition to the above iodine-containing compounds, any iodine-containing compound such as palladium iodide, silver iodide, neodymium iodide, etc. can be used.

The iodine-containing compound is compounded in an amount of between 0.01 and 30 wt. parts to 100 wt. parts of the polyamide. When the amount of the iodine-containing compound is less than 0.01 wt. part, the sensitization properties and the stabilizing effect on the half-wave current passage are insufficient. When it exceeds 30 wt. parts, the physical properties of the composition are deteriorated.

Zinc oxide and other metal oxides can be used as the receptors for iodide ions which are formed from the iodine-containing compounds, when the polymer composition is used at a high temperature for a long time. Such metal oxides contribute to the prevention of the formation of metal iodides on the metal electrode surfaces. Furthermore, in the case of zinc oxide, the linked cycle may be established that zinc oxide forms zinc iodide and formed zinc iodide functions to increase the stability of half-wave current passage. The other metal oxides may have the same function. Accordingly, the metal oxides can increase the heat stability of the plastic thermistor, and thus the heat resistance stability of the temperature sensors or thermosensitive heaters comprising the plastic thermistor.

The metal oxide is compounded in an amount of between 0.01 and 30 wt. parts to 100 wt. parts of the polyamide. When the amount of metal oxide is less than 0.01 wt. parts, the above effects are insufficiently achieved. When it exceeds 30 wt. parts, the physical properties of the composition are deteriorated.

When the iodine-containing organic compound is used as the iodine donor, its combination with zinc oxide can attain the sensitization properties and the stabilizing effect on the half-wave current passage in the same way as the sole addition of zinc iodide.

When the polycondensate of the phenol compound with the aldehyde is further compounded in the polymer composition, octyl p-hydroxybenzoate-aldehyde polycondensate and isostearyl p-hydroxybenzoate-formaldehyde polycondensate are preferable as the polycondensate of the phenol compound with the aldehyde having good compatibility with the polyamide, in view of the compatibility and moisture resistance. In addition to the polycondensates of the above alkyl p-hydroxybenzoates, polycondensates of p-dodecylphenol, p-chlorophenol and nonyl p-hydroxybenzoate with the aldehyde, and like can be used.

The polycondensate is compounded in an amount of between 5 and 30 wt. parts per 100 wt. parts of the polyamide. When the amount of the polycondensate is less than 5 wt. parts, the above effects are insufficiently achieved. When it exceeds 30 wt. parts, the physical properties of the composition are deteriorated.

Evaluation of Thermosensitive Devices

Figure 2:
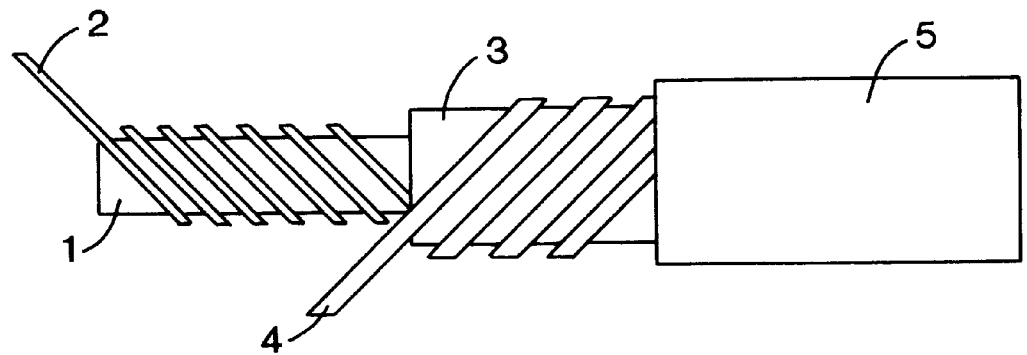
FIG. 2 is a partly broken side view of the temperature-sensing heating wire comprising the plastic thermistors of Examples 2 and 3 according to the present invention.

To evaluate the thermosensitive devices of Example 2, pellets of a Nylon composition comprising Nylon 12 (100 wt. parts), cobalt iodide (5.0 wt. parts) and magnesium oxide (5.0 wt. parts) was prepared, and a thermosensitive device, that is, a temperature-sensing heater shown in FIG. 2 was assembled.

This temperature-sensing heater consisted of a polyester core fiber 1 of 1500 deniers, a copper wire 2 containing 0.5% of silver, a Nylon temperature-sensing layer 3, an electrode wire 4 for detecting heat generation and temperature, and a jacket 6 made of heat resistant polyvinyl chloride.

To evaluate the thermosensitive devices of Example 3, pellets of a Nylon composition comprising Nylon 12 (100 wt. parts), cobalt iodide (5.0 wt. parts) and zinc oxide (5.0 wt. parts) was prepared, and a temperature-sensing heater shown in FIG. 2 was assembled in the same way as for Example 2.

The heaters of Examples 2 and 3 had a thermistor B constant of 13,600 (K) which is about 3.3 times higher than that of a comparative temperature-sensing heater having a temperature-sensing layer which consisted of Nylon 12 only. Furthermore, the heaters of Examples 2 and 3 had the durability of 3000 hours or longer against the continuous application of half-wave current of 100 V at 100° C., which was carried out as the heat resistant life test.

The durability was increased to 8000 hours or longer when an electrode wire which consists of a copper electrode wire containing 0.5% of silver and is plated with nickel at a thickness of about 30 $\mu$m was used.

The heater wire having the temperature-sensing function has the stable properties for keeping warmth with insulation, since it has good heat resistance. Therefore, it can impart long life and safety to electric warming equipments such as electric carpets, blankets, cushions, mats, floor heaters, wall heaters, panel heaters, heating pads, foot warmers, automobile sheet heaters, and the like.

A prototype electric carpet having a size of 180 cm square and a power consumption of 610 W had ten times longer durability against half-wave current application at 100°0 C. than an electric carpet equipped with a conventional thermistor.

Example 4

In Example 4, zinc iodide with good heat stability was used as a current stabilizer for imparting electrical conductivity which increases the temperature dependence of impedance of the polymer as in Example 2. Furthermore, zinc oxide powder having particle sizes between 0.1 and 0.5 $\mu$m was used as an iodine receptor. When a polycondensate of a phenol compound with an aldehyde was used, 15 wt. parts of octyl hydroxybenzoate-formamide polycondensate having good compatibility with the polyamide was used per 100 wt. parts of the polyamide.

Then, a sample was produced by forming a sheet having the same sizes as in Example 2, and forming copper electrodes on both surfaces of the sheet.

The dependence of the properties on the electrode materials was studied using the electrode materials listed in Table 6.

The temperature dependence of impedance was expressed by a thermistor B constant between 40° C. and 80° C.

The heat resistance stability was expressed by the temperature difference ($\Delta T_2$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Tables 5 and 6.

TABLE 5

Composition of plastic thermistor, electrode materials and properties

| | Composition (wt. parts) | | | Thermistor B constant (K) | $\Delta T_z$ (° C.) |
|---|---|---|---|---|---|
| | Polyamide | Zinc iodide | Zinc oxide | Others | | |
| Com. Ex. 1 | Nylon 12 (100) | — | | | 3,500 | 18 |
| Com. Ex. 2 | N-alkyl substituted nylon 11 (100) | — | | | 3,000 | 19.5 |
| Com. Ex. 3 | Nylon 12 (100) | Zinc iodide (4.0) | | | 11,600 | ≧25 |
| Ex. 1 | Nylon 12 (100) | Zinc iodide (4.0) | (3.0) | | 11,600 | 13 |
| Ex. 2 | Nylon 12 (100) | Zinc iodide dihydrate (5.2) | (3.0) | | 12,000 | 12 |
| Ex. 3 | Nylon 12-nylon 40 copolymer (60) Nylon 12 (40) | Zinc iodide (4.0) | (3.0) | | 11,500 | 12 |
| Ex. 4 | Nylon 12 (70) N-alkyl substituted nylon (30) | Zinc iodide (4.0) | (3.0) | | 12,000 | 14 |
| Ex. 5 | Nylon 12 (50) Polyetheramide (50) | Zinc iodide (4.0) | (3.0) | Octyl oxybenzoate-formaldehyde polycondensate (15) | 11,600 | 15 |
| Ex. 6 | Nylon 11 (65) N-alkyl substituted nylon (20) Dimer acid-containing amide (15) | Zinc iodide (4.0) | (3.0) | | 11,500 | 14 |

TABLE 6

Composition of plastic thermistor, electrode materials and properties

| | Composition (wt. parts) | | Electrode material | Thermistor B constant (K) | $\Delta T_z$ (° C.) |
|---|---|---|---|---|---|
| | Polyamide | Additive | | | |
| Com. Ex. 1 | Nylon 12 (100) | Zinc iodide (4.0) Zinc oxide (3.0) | Copper sheet | 11,600 | 13 |
| Ex. 1 | N-alkyl substituted nylon 11 (100) | Zinc iodide (4.0) Zinc oxide (3.0) | Silver sheet | 11,800 | 3 |
| Ex. 2 | Nylon 12-nylon 40 copolymer (100) | Zinc iodide (4.0) Zinc oxide (3.0) | Silver-plated copper sheet | 11,900 | 3 |
| Ex. 3 | Nylon 12 (100) | Zinc iodide (4.0) Zinc oxide (3.0) | Tin-plated copper sheet | 11,600 | 4 |
| Ex. 4 | Nylon 12 (100) | Zinc iodide dihydrate (5.2) Zinc oxide (4.0) | Solder-plated copper sheet | 11,500 | 4.5 |
| Ex. 5 | Nylon 12 (100) | Zinc iodide (4.0) Zinc oxide (3.0) | Stainless steel sheet | 11,600 | 4 |
| Ex. 6 | Nylon 12 (100) | Zinc iodide (4.0) Zinc oxide (3.0) | Palladium/gold-plated copper sheet | 11,600 | 3 |

Example 5

In Example 5, zinc iodide with good heat stability was used as current stabilizers for imparting electrical conductivity which increase the temperature dependence of impedance of the polymer and zinc oxide having particle sizes between 0.1 and 0.5 μm was used as an iodine receptor, as in Example 4.

To increase the antioxidative properties and heat stability, triethylene glycol-bis[3-(3-tert.-butyl-5-methyl-4-hydroxyphenyl)propionate (molecular weight of 586.8), pentaerythrityl-tetrakis[3-(3,5-di-tert.-butyl-4-hydroxyphenyl)propionate] (molecular weight of 1177.7), N,N'-hexamethylene-bis(3,5-di-tert.-butyl-4-hydroxyhydrocinnamide) (molecular weight of 637.0), and 3,9-bis{2-[3-(3-tert.-butyl-4-hydroxy-5-methylphenyl)propionyloxy]-1,1-dimethylethyl}-2,4,8,10-tetraoxaspiro[5.5]undecane (molecular weight of 741) were selected as the hindered phenols, and phenyl-α-naphthylamine (molecular weight of 404) was selected as the naphthylamine.

When a polycondensate of a phenol compound with an aldehyde was used, 15 wt. parts of octyl hydroxybenzoate-formamide polycondensate having good compatibility with the polyamide was used per 100 wt. parts of the polyamide.

Then, a sample was produced by forming a sheet having the same sizes as in Example 2, and forming copper electrodes on both surfaces of the sheet.

The dependence of the properties on the electrode materials was studied using the electrode materials listed in Table 8.

The temperature dependence of impedance was expressed by a thermistor B constant between 40° C. and 80° C.

The heat resistance stability was evaluated in terms of a time in which the yield strength decreased to half of the initial value, when a heat aging test in an air at 120° C. was performed with a dumbbell shaped sample. Also, the heat resistance stability was expressed by the temperature difference ($\Delta T_2$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Tables 7 and 8.

TABLE 7

Composition and properties of plastic thermistor (copper electrodes)

| | Composition (wt. parts) | | | Thermistor B constant (K) | $\Delta T_z$ (° C.) | Half value of yield strength (h) |
|---|---|---|---|---|---|---|
| | Polyamide | Zinc iodide Zinc oxide | Others | | | |
| Com. Ex. 1 | Nylon 12 (100) | — | | 3,500 | 18 | 2,000 |
| Com. Ex. 2 | N-alkyl substituted nylon 11 (100) | — | | 3,000 | 19.5 | 1,600 |
| Com. Ex. 3 | Nylon 12 (100) | Zinc iodide (4.0) Zinc oxide (3.0) | | 11,600 | ≧25 | 2,300 |
| Ex. 1 | Nylon 12 (100) | Zinc iodide (4.0) Zinc oxide (3.0) | Triethyleneglycol-bis-[3-(3-t-butyl-5-methyl-4-hydroxyphenyl)-propionate] (0.5) | 11,600 | 13 | 3,200 |
| Ex. 2 | Nylon 12 (100) | Zinc iodide dihydrate (5.2) Zinc oxide (4.0) | Pentaerythrityl-tetrakis-[3-(3,5-di-t-butyl-4-hydroxyphenyl)-propionate] (0.5) | 12,000 | 12 | 3,000 |
| Ex. 3 | Nylon 12-nylon 40 copolymer (60) Nylon 12 (40) | Zinc iodide (4.0) Zinc oxide (3.0) | N,N'-hexamethylene-bis(3,5-di-t-butyl-4-hydroxy-hydro-cinnamide) (0.5) | 11,500 | 12 | 3,500 |
| Ex. 4 | Nylon 12 (70) N-alkyl substituted nylon (30) | Zinc iodide dihydrate (5.2) Zinc oxide (4.0) | 3,9-bis{2-[3-(3-t-butyl-4-hydroxy-5-methylphenyl) propionyloxy]-1,1-dimethylethyl}-2,4,8,10-tetraoxaspiro[5,5] undecane (0.5) | 12,000 | 14 | 4,000 |
| Ex. 5 | Nylon 12 (50) Polyether-amide (50) | Zinc iodide (4.0) Zinc oxide (3.0) | Octyl oxybenzoate ester-formaldehyde polycondensate (15) Phenyl-α-naphthylamine (1.0) | 11,600 | 15 | 3,500 |
| Ex. 6 | Nylon 11 (65) N-alkyl substituted nylon (20) Dimer acid-containing amide (15) | Zinc iodide (4.0) Zinc oxide (3.0) | N,N'-di-β-naphthyl-p-phenylenediamine (1.0) | 11,500 | 14 | 2,900 |

TABLE 8

Composition of plastic thermistor, electrode materials and properties

| | Composition (wt. parts) | | Electrode material | Thermistor B constant (K) | $\Delta T_z$ (° C.) |
|---|---|---|---|---|---|
| | Polyamide | Additive | | | |
| Com. Ex. 1 | Nylon 12 (100) | Zinc iodide (4.0) Zinc oxide (3.0) | Copper sheet | 11,600 | 13 |
| Ex. 1 | N-alkyl substituted nylon 11 (100) | Zinc iodide (4.0) Zinc oxide (3.0) Triethyleneglycol-bis[3-(3-t-butyl-4-hydroxyphenyl) propionate] (0.5) | Silver sheet | 11,800 | 3 |
| Ex. 2 | Nylon 12-nylon 40 copolymer (100) | Zinc iodide (4.0) Zinc oxide (3.0) Pentaerythrityl-tetrakis[3-(3,5-di-t-butyl-4-hydroxyphenyl) propionate] (0.5) | Silver-plated copper sheet | 11,900 | 3 |
| Ex. 3 | Nylon 12 (100) | Zinc iodide (4.0) Zinc oxide (3.0) N,N'-hexamethylenebis(3,5-di-t-butyl-4-hydroxy-hydrocinnamide) (0.5) | Tin-plated copper sheet | 11,600 | 4 |
| Ex. 4 | Nylon 12 (100) | Zinc iodide dihydrate (5.2) Zinc oxide (4.0) 3,9-bis{2-[3-(3-t-butyl-4-hydroxy-5-methylphenyl) propionyloxy]-1,1-dimethylethyl}-2,4,8,10-tetraoxaspiro[5,5] undecane (0.5) | Solder-plated copper sheet | 11,500 | 4.5 |
| Ex. 5 | Nylon 12 (100) | Zinc iodide (4.0) Zinc oxide (3.0) Phenyl-α-naphthylamine (1.0) | Stainless steel sheet | 11,600 | 4 |
| Ex. 6 | Nylon 12 (100) | Zinc iodide (4.0) Zinc oxide (3.0) N,N'-di-β-naphthyl-p-phenylenediamine (1.0) | Palladium/gold-plated copper sheet | 11,600 | 3 |

Example 6

In Example 6, Nylon 12, Nylon 12-Nylon 40 copolymer, N-alkyl-substituted polyamide 11, polyether amide and dimer acid-containing amide, which have low moisture absorption, were selected as polyamides.

Zinc iodide with good heat stability was used as a current stabilizer for imparting electrical conductivity which increase the temperature dependence of impedance of the polymer, and zinc oxide having particle sizes between 0.1 and 0.5 μm was used as an iodine receptor.

As the components for improving the heat resistance stability and reduction rust-preventing properties through the synergistic effects together with zinc oxide, tetraphenyl dipropylene glycol diphosphite (molecular weight of 566 and phosphorus content of 10.9 wt. %), tetraphenyl tetra (tridecyl)pentaerythritol tetraphosphite (molecular weight of 1424 and phosphorus content of 8.7 wt. %) and hydrogenated phenol A pentaerythritol phosphite polymer (molecular weight of 2500–3100 and phosphorus content of 13.8 wt. %) were selected as the phosphite esters. The amount of the phosphite ester was 1 wt. part per 100 wt. parts of the polyamide.

To increase the antioxidative properties and heat stability, triethylene glycol-bis[3-(3-tert.-butyl-5-methyl-4-hydroxyphenyl)propionate (molecular weight of 586.8) was selected as the hindered phenol, and phenyl-α-naphthylamine (molecular weight of 404) was selected as the naphthylamine.

When a polycondensate of a phenol compound with an aldehyde was used, 15 wt. parts of octyl hydroxybenzoate-formamide polycondensate having good compatibility with the polyamide was used per 100 wt. parts of the polyamide.

The above components were compounded and kneaded with an extruder. Then, the compound was heat pressed, and a sheet having a size of about 70×70 mm and a thickness of 1 mm was obtained.

A sample was produced by forming copper electrodes on both surfaces of the sheet.

The dependence of the properties on the electrode materials was studied using the electrode materials listed in Table 10.

The temperature dependence of impedance was expressed by a thermistor B constant between 40° C. and 80° C.

The heat resistance stability was evaluated in terms of a time in which the yield strength decreased to half of the initial value, when a heat aging test in an air at 120° C. was performed with a dumbbell shaped sample. Also, the heat resistance stability was expressed by the temperature difference ($\Delta T_2$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Tables 9 and 10.

TABLE 9

Composition and properties of plastic thermistor (copper electrodes)

| | Polyamide | Zinc iodide Zinc oxide | Phosphite compound and others | Thermistor B constant (K) | $\Delta T_z$ (K) | Half value of yield strength (h) |
|---|---|---|---|---|---|---|
| Com. Ex. 1 | Nylon 12 (100) | — | — | 3,500 | 18 | 2,000 |
| Com. Ex. 2 | N-alkyl substitued nylon 11 (100) | — | — | 3,000 | 19.5 | 1,600 |
| Com. Ex. 3 | Nylon 12 (100) | Zinc iodide (1.0) | — | 11,000 | ≧25 | 2,000 |
| Ex. 1 | Nylon 12 (100) | Zinc iodide (5.5) Zinc oxide (4.0) | Tetraphenyldipropyleneglycol diphosphite (1.0) | 11,600 | 11 | 3,100 |
| Ex. 2 | Nylon 12 (100) | Zinc iodide dihydrate (7.2) Zinc oxide (4.0) | Tetraphenyltetra(tridecyl) pentaerythritol tetraphosphite (1.0) | 12,100 | 10 | 3,120 |
| Ex. 3 | Nylon 12-nylon 40 copolymer (60) Nylon 12 (40) | Zinc iodide (5.5) Zinc oxide (4.0) | Hydrogenated bisphenol A pentaerythritol phosphite polymer (1.0) | 11,400 | 11 | 3,550 |
| Ex. 4 | Nylon 12 (70) N-alkyl substituted nylon (30) | Zinc iodide dihydrate (7.2) Zinc oxide (4.0) | Tetraphenyltetra(tridecyl) pentaerythritol tetraphosphite (1.0) Triethyleneglycol-bis[3-(3-t-butyl-5-methyl-4-hydroxyphenyl)propionate] (0.5) | 11,900 | 10 | 4,100 |
| Ex. 5 | Nylon 12 (50) Polyetheramide (50) | Zinc iodide (5.5) Zinc oxide (4.0) | Tetraphenyltetra(tridecyl) pentaerythritol tetraphosphite (1.0) Octyl oxybenzoate ester-formaldehyde polycondensate (15) Phenyl-α-naphthylamine (1.0) | 11,000 | 14 | 1,900 |

TABLE 9-continued

Composition and properties of plastic thermistor (copper electrodes)

| | Composition (wt. parts) | | | Thermistor B | | Half value of |
| --- | --- | --- | --- | --- | --- | --- |
| | Polyamide | Zinc iodide Zinc oxide | Phosphite compound and others | constant (K) | $\Delta T_z$ (K) | yield strength (h) |
| Ex. 6 | Nylon 11 (65) N-alkyl substituted nylon (20) Dimer acid-containing amide (15) | Zinc iodide (5.5) Zinc oxide (4.0) | Tetraphenyltetra(tridecyl) pentaerythritol tetraphosphite (1.0) N,N'-di-β-naphthyl-p-phenylenediamine (1.0) | 11,500 | 11 | 3,300 |

TABLE 10

Composition of plastic thermistor, electrode materials and properties

| | Composition (wt. parts) | | Electrode material | Thermistor B constant (K) | $\Delta T_z$ (° C.) |
| --- | --- | --- | --- | --- | --- |
| | Polyamide | Additive | | | |
| Com. Ex. 1 | Nylon 12 (100) | Zinc iodide (5.5) Zinc oxide (4.0) | Copper sheet | 11,600 | 13 |
| Ex. 1 | N-alkyl substituted nylon 11 (100) | Zinc iodide (5.5) Zinc oxide (4.0) Tetraphenyldipropylene-glycol diphosphite (1.0) | Silver sheet | 11,700 | 2 |
| Ex. 2 | Nylon 12-nylon 40 copolymer (100) | Zinc iodide (5.5) Zinc oxide (4.0) Tetraphenyldipropylene-glycol diphosphite (1.0) | Silver-plated copper sheet | 11,800 | 3 |
| Ex. 3 | Nylon 12 (100) | Zinc iodide (5.5) Zinc oxide (4.0) Tetraphenyldipropylene-glycol diphosphite (1.0) N,N'-hexamethylenebis(3,5-di-t-butyl-4-hydroxy-hydrocinnamide) (0.5) | Tin-plated copper sheet | 11,700 | 4 |
| Ex. 4 | Nylon 12 (100) | Zinc iodide dihydrate (7.2) Zinc oxide (4.0) Tetraphenyldipropylene-glycol diphosphite (1.0) | Solder-plated copper sheet | 11,400 | 4.1 |
| Ex. 5 | Nylon 12 (100) | Zinc iodide (5.5) Zinc oxide (4.0) Tetraphenyldipropylene-glycol diphosphite (1.0) | Stainless steel sheet | 11,600 | 3.8 |
| Ex. 6 | Nylon 12 (100) | Zinc iodide (5.5) Zinc oxide (4.0) Tetraphenyldipropylene-glycol diphosphite (1.0) | Palladium/gold-plated copper sheet | 11,600 | 2 |

Example 7

In Example 7, zinc iodide with good heat stability was used as a half-wave current stabilizer for imparting electrical conductivity which increases the temperature dependence of impedance of the polymer, and zinc oxide having particle sizes between 0.1 and 0.5 μm was used as an iodine receptor.

As a stabilizer for an interface between the copper electrodes and the polyamide composition through the synergistic effect together with zinc oxide, decamethylenedicarboyxlic acid disalicyloylhydrazide, N,N'-bis[3-(3,5-tert.-butyl-4-hydroxyphenyl)propionyl]hydrazine, 1,2,3-benzotriazole and its derivatives, that is, 1-hydroxymethylbenzotriazole and 1,2-dicarboxyethyl-benzotriazole were used. The amount of these stabilizers was 1 wt. part per 100 wt. parts of the polyamide.

Pentaerythrityl-tetrakis[3-(3,5-di-tert.-butyl-4-hydroxyphenyl)propionate (molecular weight of 1177.7) was selected as the hindered phenol for increasing the antioxidative properties and heat stability, and phenyl-α-naphthylamine (molecular weight of 404) was selected as the naphthylamine.

Tetraphenyldipropylene glycol phosphite (molecular weight of 566 and phosphorus content of 10.9 wt. %) was selected as the phosphite ester.

When a polycondensate of a phenol compound with an aldehyde was used, 15 wt. parts of octyl hydroxybenzoate-formamide polycondensate having good compatibility with the polyamide was used per 100 wt. parts of the polyamide.

Then, a sample was produced by forming a sheet having the same sizes as in Example 2, and forming copper electrodes on both surfaces of the sheet.

The temperature dependence of impedance was expressed by a thermistor B constant between 40° C. and 80° C.

The heat resistance stability was evaluated in terms of a time in which the yield strength decreased to half of the initial value, when a heat aging test in an air at 120° C. was performed with a dumbbell shaped sample. Also, the heat resistance stability was expressed by the temperature difference ($\Delta T_z$) between the initial impedance at 100° C. and the impedance after applying the half-wave current of 100 V for 1000 hours at 100° C.

The thermistor B constant between 40° C. and 80° C. was calculated from the results obtained by measuring the impedances $Z_{40}$ and $Z_{80}$ at 40° C. 80° C., respectively.

The results are shown in Table 11.

TABLE 11

Composition and properties of plastic thermistor (copper electrodes)

| | Composition (wt. parts) | | | Thermistor B constant (K) | $\Delta T_z$ (K) | Half value of yield strength (h) |
|---|---|---|---|---|---|---|
| | Polyamide | Zinc iodide Zinc oxide | Metal passivator and others | | | |
| Com. Ex. 1 | Nylon 12 (100) | — | — | 3,500 | 18 | 2,000 |
| Com. Ex. 2 | N-alkyl substituted nylon 11 (100) | — | — | 3,000 | 19.5 | 1,600 |
| Com. Ex. 3 | Nylon 12 (100) | Zinc iodide (1.0) | — | 11,000 | $\geq 25$ | 2,000 |
| Ex. 1 | Nylon 12 (100) | Zinc iodide (5.5) Zinc oxide (4.0) | Decamethylene-dicarboxylic acid salicylhydrazide (0.5) | 11,500 | 6.1 | 2,100 |
| Ex. 2 | Nylon 12 (100) | Zinc iodide dihydrate (7.2) Zinc oxide (4.0) | N,N'-bis[3-(3,5-di-t-butyl-4-hydroxyphenyl) propionyl)hydrazine (0.5) | 11,450 | 6.5 | 2,120 |
| Ex. 3 | Nylon 12 (70) N-alkyl substituted nylon (30) | Zinc iodide dihydrate (7.2) Zinc oxide (4.0) | 1,2,3-Benzotriazole (0.1) | 11,480 | 5.5 | 1,550 |
| Ex. 4 | Nylon 12 (100) | Zinc iodide (5.5) Zinc oxide (4.0) | 1-hydroxymethyl benzotriazole (0.1) | 11,500 | 6.2 | 1,700 |
| Ex. 5 | Nylon 12 (100) | Zinc iodide (5.5) Zinc oxide (4.0) | 1,2-dicarboxyethylbenzotriazole (0.1) | 11,600 | 5.8 | 1,700 |
| Ex. 6 | Nylon 12-Nylon 40 copolymer (60) Nylon 12 (40) | Zinc iodide (5.5) Zinc oxide (4.0) | Decamethylene-dicarboxylic acid salicylhydrazide (0.5) N,N'-bis[3-(3,5-di-t-butyl-4-hydroxyphenyl) propionyl)hydrazine (0.5) Tetraphenyl dipropyleneglycol diphosphite (1.0) Pentaerythrityl-tetrakis[3-(3,5-di-t-butyl-4-hydroxyphenyl) propionate] (1.0) | 11,610 | 4.0 | 3,800 |
| Ex. 6 | Nylon 12 (50) Polyetheramide (50) Nylon 12 (40) | Zinc iodide (5.5) Zinc oxide (4.0) | Decamethylene-dicarboxylic acid salicylhydrazide (0.5) N,N'-bis[3-(3,5-di-t-butyl-4-hydroxyphenyl) propionyl)hydrazine (0.5) Tetraphenyl dipropyleneglycol diphosphite (1.0) Octyl oxybenoate ester-formaldehyde polycondensate (15) Phenyl-α-naphthylamine (1.0) | 11,610 | 4.5 | 1,500 |
| Ex. 8 | Nylon 11 (65) N-alkyl substituted nylon (20) Dimer acid-containing amide (15) | Zinc iodide (5.5) Zinc oxide (4.0) | Decamethylene-dicarboxylic acid salicylhydrazide (0.5) Tetraphenyl dipropyleneglycol diphosphite (1.0) N,N'-di-β-naphthyl-p-phenylenediamine (1.0) | 11,400 | 6.0 | 3,300 |

As seen from Examples 4 to 7, anhydrous zinc iodide and zinc iodide dihydrate can be used as the current stabilizers, and contribute to the increase of the thermistor B constants. They are compounded in an amount of between 0.01 and 30 wt. parts to 100 wt. parts of the polyamide. When the amount is less than 0.01 wt. part, the sensitization properties and the stabilizing effect on the half-wave current passage are insufficient. When it exceeds 30 wt. parts, the physical properties of the composition are deteriorated.

Zinc oxide can be used as the receptors for iodide ions which are formed from zinc iodide, when the polymer composition is used at a high temperature for a long time. Zinc oxide contributes to the prevention of the formation of zinc iodide on the metal electrode surfaces. When zinc oxide is used, the linked cycle may be established that zinc oxide forms zinc iodide and formed zinc iodide functions to increase the current stability. Accordingly, zinc oxide can increase the heat stability of the plastic thermistor, and thus the heat resistance stability of the temperature sensors or thermosensitive heaters comprising the plastic thermistor.

Zinc oxide is compounded in an amount of between 0.01 and 30 wt. parts to 100 wt. parts of the polyamide. When the amount of metal oxide is less than 0.01 wt. parts, the above effects are insufficiently achieved. When it exceeds 30 wt. parts, the physical properties of the composition are deteriorated.

Furthermore, triethylene glycol-bis[3-(3-tert.-butyl-5-methyl-4-hydroxyphenyl)propionate], pentaerythrityl-tetrakis[3-(3,5-di-tert.-butyl-4-hydroxyphenyl)propionate], N,N'-hexamethylenebis(3,5-di-tert.-butyl-4-hydroxy-hydrocinnamide), 3,9-bis{2-{3-(3-tert.-butyl-4-hydroxy-5-methylphenyl)propionyloxy]-1,1-dimethylethyl}-2,4,8,10-tetraoxaspiro[5.5]undecane, and naphthylamines can be used as the antioxidants, and contribute to the improvement of heat resistance. The combination of the antioxidants has the synergistic effects.

Tetraphenyl dipropylene glycol diphosphite, tetraphenyl tetra(tridecyl)pentaerythritol tetraphosphite and hydrogenated phenol A pentaerythritol phosphite polymer can be used as the phosphite esters having the high molecular weight and low volatility and containing phosphorus at a suitable concentration, and contribute to the improvement of the heat resistant stability and rust-preventing properties. Their combination with the hindered phenol and naphthylamine as the antioxidants has the synergistic effects.

Octyl p-hydroxybenzoate-aldehyde polycondensate and isostearyl p-hydroxybenzoate-formaldehyde polycondensate are preferable as the polycondensate of the phenol compound with the aldehyde, in view of the compatibility and moisture resistance. In addition to the polycondensates of the above alkyl p-hydroxybenzoates, polycondensates of p-dodecylphenol, p-chlorophenol and nonyl p-hydroxybenzoate with the aldehyde, and the like can be used.

The polycondensate is compounded in an amount of between 5 and 30 wt. parts per 100 wt. parts of the polyamide. When the amount of the polycondensate is less than 5 wt. parts, the above effects are insufficiently achieved. When it exceeds 30 wt. parts, the physical properties of the composition are deteriorated.

In the case where the metal inactivation agent is added, decamethylenedicarboyxlic acid disalicyloylhydrazide, N,N'-bis[3-(3,5-tert.-butyl-4-hydroxyphenyl)propionyl] hydrazine, 1,2,3- when an electrode wire which consists of a copper electrode wire containing 0.5% of silver and plated with a solder of 95% of tin and 5% of lead at a thickness of about 30 μm was used.

Figure 3:
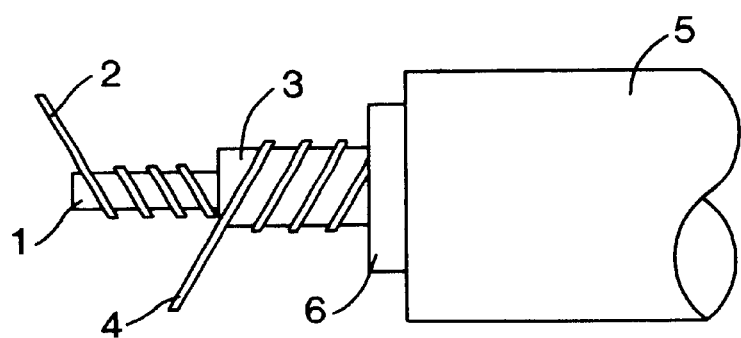
FIG. 3 is a partly broken side view of the temperature-sensing heating wire comprising the plastic thermistors of Examples 4 to 7 according to the present invention.

To evaluate the thermosensitive devices of Examples 6 and 7, pellets of a Nylon composition comprising Nylon 12 (100 wt. parts), zinc iodide (5.5 wt. parts), zinc oxide (4.0 wt. parts), decamethylenedicarboyxlic acid disalicyloylhydrazide (0.5 wt. part), N,N'-bis[3-(3,5-tert.-butyl-4-hydroxyphenyl)propionyl]hydrazine (0.5 wt. part), tetraphenyl dipropylene glycol diphosphite (1 wt. part), and pentaerythrityl-tetrakis[3-(3,5-di-tert.-butyl-4-hydroxyphenyl)propionate] (1 wt. part) was prepared, and a thermosensitive device, that is, a temperature-sensing wire shown in FIG. 3 was assembled.

This temperature-sensing wire according to the present invention had a thermistor B constant of 11,000 (K) which is about 3.3 times higher than that of a comparative temperature-sensing heater having a temperature-sensing layer which consisted of Nylon 12 only. Further, the temperature-sensing wire according to the present invention had the durability of 4000 hours or longer against the continuous application of half-wave current of 100 V at 100° C.

The above Examples have been explained by using zinc oxide as the material which functions as the iodide ion receptor and prevents the formation of metal iodides on the metal electrode surfaces. It is possible to use magnesium oxide, lead oxide, and the like in place of zinc oxide according the specifications of the devices as long as the required properties are satisfied. That is, any metal oxide that functions as the iodide ion receptor and prevents the formation of metal iodides on the metal electrode benzotriazole and its derivatives, that is, 1-hydroxymethylbenzotriazole and 1,2-dicarboxyethylbenzotriazole were used as the stabilizer for the interface between the copper electrodes and the polyamide composition. In addition to these compounds, 1-(2,3-dihydroxypropylbenzotriazole, hexamethylenedi (aminomethylbenzotriazolyl), 1-[N,N'-bis(2-ethylhexyl) benzotriazole-4,4-(diaminomethylbenzotriazole-phenyl) methane, bis[(1-benzotriazole)methyl]phosphoric acid, and the like can be used as the triazole derivatives.

Evaluation of Thermosensitive Devices

To evaluate the thermosensitive devices of Examples 4 and 5, pellets of a Nylon composition comprising Nylon 12 (100 wt. parts), zinc iodide (7.0 wt. parts) and zinc oxide (5.0 wt. parts) was prepared, and a thermosensitive device, that is, a temperature-sensing wire shown in FIG. 3 was assembled.

This temperature-sensing wire consisted of a polyester core fiber 1 of 1500 deniers, a copper wires 2, 4 containing 0.5% of silver, a Nylon temperature-sensing layer 3, a polyester separating layer 5, and a jacket 6 made of heat resistant polyvinyl chloride.

This temperature-sensing wire according to the present invention had a thermistor B constant of 11,600 (K) which is about 3.3 times higher than that of a comparative temperature-sensing heater having a temperature-sensing layer which consisted of Nylon 12 only. Further, the temperature-sensing wire according to the present invention had the durability of 3000 hours or longer against the continuous application of half-wave current of 100 V at 100° C., which was carried out as the heat resistant life test.

The durability was increased to 5000 hours or longer surfaces may be used.

As explained above, the rate of change of the impedance-temperature curve is minimized over time and the durability at high temperature is improved by the addition of 5.3 to 30 wt. parts of zinc iodide to 100 wt. parts of the polyamide.

The combination of iodine, iodine-containing compounds or zinc iodide which is an iodine-containing compound and the metal oxide or zinc oxide which is a metal oxide increases the thermistor B constant, and stabilizes the mechanical and electrical properties at high temperature for a long time, and therefore improves the reliability of the devices in many practical applications.

The combination of iodine, iodine-containing compounds or zinc iodide which is an iodine-containing compound, the metal oxide or zinc oxide which is a metal oxide, and further the hindered phenol or naphthylamine increases the thermistor B constant and also stabilizes the mechanical and electrical properties at high temperature for a long time, and therefore improves the reliability of the devices significantly.

The combination of iodine, iodine-containing compounds or zinc iodide which is an iodine-containing compound, the metal oxide or zinc oxide which is a metal oxide, and further the metal inactivation agent increases the thermistor B constant and also prevents the thermal deterioration of the composition caused by the copper when the copper electrodes are used. In addition, this combination stabilizes the mechanical and electrical properties at high temperature for a long time, and therefore improves the reliability of the devices.

The combination of iodine, iodine-containing compounds or zinc iodide which is an iodine-containing compound, the metal oxide or zinc oxide which is a metal oxide, and further the phosphite ester increases the thermistor B constant and also stabilizes the mechanical and electrical properties at high temperature for a long time, and therefore improves the reliability of the devices.

When copper, aluminum, gold, platinum, palladium, silver, tin, solder, nickel, stainless steel, titanium or indium is used as the material of at least one electrode, the rate of change of the current passage against temperature is small, and the stability over time is further improved. When the surface layer of at least one electrode is formed from a metal different from the material constituting the inner layer of the electrode such as gold, platinum, palladium, silver, tin, solder, nickel, titanium or indium, the stability of electric current passage and cost reduction are both achieved, and therefore, the devices become more practical.

What is claimed is:

1. A thermosensitive device comprising a pair of electrodes at least one of which is a copper electrode, and a plastic thermistor connected between the electrodes, wherein said plastic thermistor consists of a polyamide composition comprising 100 parts by weight of a polyamide, 1.5 to 30 parts by weight of at least one additive selected from the group consisting of iodine and iodine-containing compounds, 0.01 to 30 parts by weight of a metal oxide, and at least one compound selected from the group consisting of a naphthylamine and a hindered phenol compound.

2. The thermosensitive device according to claim 1, wherein said iodine-containing compound is at least one compound selected from the group consisting of zinc iodide, tin iodide, antimony iodide, copper iodide, nickel iodide, manganese iodide, cobalt iodide, iron iodide, lead iodide, cadmium iodide, titanium iodide, sodium iodide, potassium iodide and their hydrates.

3. The thermosensitive device according to claim 1, wherein said polyamide is at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

4. The thermosensitive device according to claim 1, wherein said metal oxide is zinc oxide.

5. The thermosensitive device according to claim 1, wherein said naphthylamine is at least one compound selected from the group consisting of phenyl-α-naphthylamine and N,N'-di-β-naphthyl-p-phenylenediamine.

6. The thermosensitive device according to claim 1, wherein said hindered phenol is at least one compound selected from the group consisting of triethylene glycol-bis [3-(3-tert.-butyl-5-methyl-4-hydroxyphenyl)propionate, pentaerythrityl-tetrakis[3-(3,5-di-tert.-butyl-4-hydroxyphenyl)propionate], N,N'-hexamethylenebis(3,5-di-tert.-butyl-4-hydroxy-hydrocynnamide) and 3,9-bis{2-[3-(tert.-butyl-4-hydroxy-5-methylphenyl)-propionyloxy]-1,1-dimethylethyl}-2,4,8,10-tetraoxaspiro[5.5]undecane.

7. A thermosensitive device comprising a pair of electrodes at least one of which is made of at least one metal selected from the group consisting of aluminum, gold, platinum, palladium, silver, tin, solder, nickel, stainless steel, titanium and indium, and a plastic thermistor connected between the electrodes,
wherein said plastic thermistor consists of a polyamide composition comprising 100 parts by weight of a polyamide, 1.5 to 30 parts by weight of at least one additive selected from the group consisting of iodine and iodine-containing compounds, 0.01 to 30 parts by weight of a metal oxide, and at least one compound selected from the group consisting of a naphthylamine and a hindered phenol compound.

8. The thermosensitive device according to claim 7, wherein said naphthylamine is at least one compound selected from the group consisting of phenyl-α-naphthylamine and N,N'-di-β-naphthyl-p-phenylenediamine.

9. The thermosensitive device according to claim 7, wherein said hindered phenol is at least one compound selected from the group consisting of triethylene glycol-bis [3-(3-tert.-butyl-5-methyl-4-hydroxyphenyl)propionate, pentaetythrityl-tetrakis[3-(3,5-di-tert.-butyl-4-hydroxyphenyl)propionate], N,N'-hexamethylenebis(3,5-di-tert.-butyl-4-hydroxy-hydrocynnamide) and 3,9-bis{2-[3-(tert.-butyl-4-hydroxy-5-methylphenyl)-propionyloxy]-1,1-dimethylethyl}-2,4,8,10 -tetraoxaspiro[5.5]undecane.

10. The thermosensitive device according to claim 7, wherein said iodine-containing compound is at least one compound selected from the group consisting of zinc iodide, tin iodide, antimony iodide, copper iodide, nickel iodide, manganese iodide, cobalt iodide, iron iodide, lead iodide, cadmium iodide, titanium iodide, sodium iodide, potassium iodide and their hydrates.

11. The thermosensitive device according to claim 7, wherein said polyamide is at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

12. The thermosensitive device according to claim 7, wherein said metal oxide is zinc oxide.

13. The thermosensitive device according to claim 7, wherein at least one of said electrodes comprises an inner layer made of at least one metal selected from the group consisting of gold, platinum, palladium, silver, copper, solder, nickel, titanium and indium, and a surface layer made of a metal different from the metal constituting the inner layer.

14. A thermosensitive device comprising a pair of electrodes at least one of which is made of at least one metal selected from the group consisting of aluminum, gold, platinum, palladium, silver, tin, solder, nickel, stainless steel, titanium and indium, and a plastic thermistor connected between the electrodes,
wherein said plastic thermistor consists of a polyamide composition comprising 100 parts by weight of a polyamide, 1.5 to 30 parts by weight of at least one additive selected from the group consisting of iodine and iodine-containing compounds, 0.01 to 30 parts by weight of a metal oxide, and a phosphite ester.

15. The thermosensitive device according to claim 14, wherein said phosphite ester is at least one compound selected from the group consisting of tetraphenyl dipropylene glycol diphosphite, tetraphenyl tetra(tridecyl) pentaerythritol tetraphosphite and hydrogenated phenol A pentaerythritol phosphite polymer.

16. The thermosensitive device according to claim 14, wherein said iodine-containing compound is at least one compound selected from the group consisting of zinc iodide, tin iodide, antimony iodide, copper iodide, nickel iodide, manganese-iodide, cobalt iodide, iron iodide, lead iodide, cadmium iodide, titanium iodide, sodium iodide, potassium iodide and their hydrates.

17. The thermosensitive device according to claim 14, wherein said polyamide is at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

18. The thermosensitive device according to claim 14, wherein said metal oxide is zinc oxide.

19. The thermosensitive device according to claim 14, wherein at least one of said electrodes comprises an inner layer made of at least one metal selected from the group consisting of gold, platinum, palladium, silver, copper, solder, nickel, titanium and indium, and a surface layer made of a metal different from the metal constituting the inner layer.

20. A thermosensitive device comprising a pair of electrodes at least one of which is made of at least one metal selected from the group consisting of aluminum, gold, platinum, palladium, silver, tin, solder, nickel, stainless steel, titanium and indium, and a plastic thermistor connected between the electrodes,
wherein said plastic thermistor consists of a polyamide composition comprising 100 parts by weight of a polyamide, 1.5 to 30 parts by weight of at least one additive selected from the group consisting of iodine and iodine-containing compounds, 0.01 to 30 parts by weight of a metal oxide, and a metal inactivation agent.

21. The thermosensitive device according to claim 20, wherein said metal inactivation agent is at least one compound selected from the group consisting of (a) decamethylenedicarboxylic acid disalicyloylhydrazine, N,N'-bis[3-3, 5-tert.butyl-4-hydroxyphenyl)propionyl]hydrazine, (b) benzotriazole and its derivatives and (c) N,N'-di-2-naphthyl-p-phenylenediamine and its derivatives.

22. The thermosensitive device according to claim 20, wherein said iodine-containing compound is at least one compound selected from the group consisting of zinc iodide, tin iodide, antimony iodide, copper iodide, nickel iodide, manganese iodide, cobalt iodide, iron iodide, lead iodide, cadmium iodide, titanium iodide, sodium iodide, potassium iodide and their hydrates.

23. The thermosensitive device according to claim 22, wherein said polyamide is at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

24. The thermosensitive device according to claim 20, wherein said metal oxide is zinc oxide.

25. The thermosensitive device according to claim 20, wherein at least one of said electrodes comprises an inner layer made of at least one metal selected from the group consisting of gold, platinum, palladium, silver, copper, solder, nickel, titanium and indium, and a surface layer made of a metal different from the metal constituting the inner layer.

26. A thermosensitive device comprising a pair of electrodes at least one of which is made of at least one metal selected from the group consisting of aluminum, gold, platinum, palladium, silver, tin, solder, nickel, stainless steel, titanium and indium, and a plastic thermistor connected between the electrodes,
wherein said plastic thermistor consists of a polyamide composition comprising 100 parts by weight of a polyamide, 1.5 to 30 parts by weight of at least one additive selected from the group consisting of iodine and iodine-containing compounds, 0.01 to 30 parts by weight of a metal oxide, and a polycondensate of a hydroxybenzoate and formaldehyde.

27. The thermosensitive device according to claim 26, wherein said iodine-containing compound is at least one compound selected from the group consisting of zinc iodide, tin iodide, antimony iodide, copper iodide, nickel iodide, manganese iodide, cobalt iodide, iron iodide, lead iodide, cadmium iodide, titanium iodide, sodium iodide potassium iodide and their hydrates.

28. The plastic thermistor according to claim 26, wherein said polyamide is at least one polyamide selected from the group consisting of (a) polyundecane amide, (b) polydodecane amide, (c) polyamide comprising a straight saturated hydrocarbon having at least 5 carbon atoms, and its copolymers, (d) copolymers of polyundecane amide or polydodecane amide with N-alkyl-substituted amides, (e) copolymers of polyundecane amide or polydodecane amide with ether amide, and (f) dimer acid-containing polyamide.

29. The thermosensitive device according to claim 26, wherein said metal oxide is zinc oxide.

30. The thermosensitive device according to claim 26, wherein at least one of said electrodes comprises an inner layer made of at least one metal selected from the group consisting of gold, platinum, palladium, silver, copper, solder, nickel, titanium and indium, and a surface layer made of a metal different from the metal constituting the inner layer.

* * * * *